United States Patent
Osada et al.

(10) Patent No.: US 8,466,598 B2
(45) Date of Patent: Jun. 18, 2013

(54) ELECTRIC ROTATING MACHINE

(75) Inventors: Masahiko Osada, Okazaki (JP); Takuzou Mukai, Handa (JP)

(73) Assignee: Denso Corporation, Kariya, Aichi-Pref (JP)

( * ) Notice: Subject to any disclaimer, the term of this patent is extended or adjusted under 35 U.S.C. 154(b) by 15 days.

(21) Appl. No.: 13/214,382

(22) Filed: Aug. 22, 2011

(65) Prior Publication Data

US 2012/0062064 A1 Mar. 15, 2012

(30) Foreign Application Priority Data

Sep. 15, 2010 (JP) ................................. 2010-206748

(51) Int. Cl.
*H02K 3/24* (2006.01)
(52) U.S. Cl.
USPC ............................. 310/260; 310/45; 310/207
(58) Field of Classification Search
USPC .. 310/207, 208, 260, 43, 45, 196, 71; 29/605, 29/606, 596
See application file for complete search history.

(56) References Cited

U.S. PATENT DOCUMENTS

| 6,809,437 | B2 * | 10/2004 | Oohashi et al. | ................. 310/45 |
| 7,498,701 | B2 * | 3/2009 | Kikuchi et al. | ............. 310/68 B |
| 2008/0315705 | A1 | 12/2008 | Obata et al. | |

FOREIGN PATENT DOCUMENTS

JP  2008-54404  3/2008

* cited by examiner

*Primary Examiner* — Dang Le
(74) *Attorney, Agent, or Firm* — Nixon & Vanderhye PC

(57) ABSTRACT

An electric rotating machine includes a multi-phase stator coil that is wound on a stator core in a distributed winding manner. Each of phase windings of the stator coil is formed of an electric wire bundle which includes a plurality of insulation-coated electric wires that are electrically connected to one another. Each of the electric wire bundles forming the phase windings has in-slot portions, which are respectively received in corresponding slots of the stator core, and turn portions that are located outside the slots of the stator core to connect adjacent pairs of the in-slot portions. Each of the electric wire bundles further includes a plurality of insulating layers that are respectively formed at predetermined positions, at which the turn portions of the electric wire bundle overlap those of the other electric wire bundles, so as to surround the electric wires of the electric wire bundle.

12 Claims, 6 Drawing Sheets

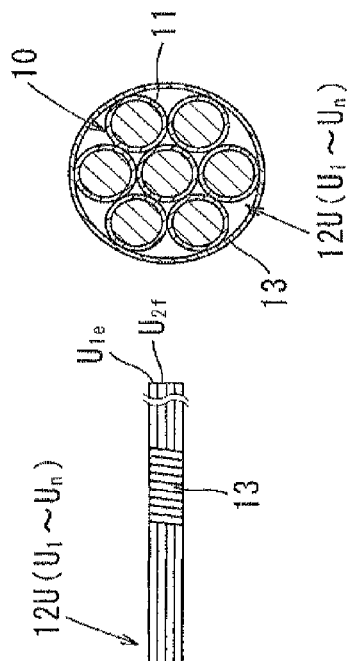
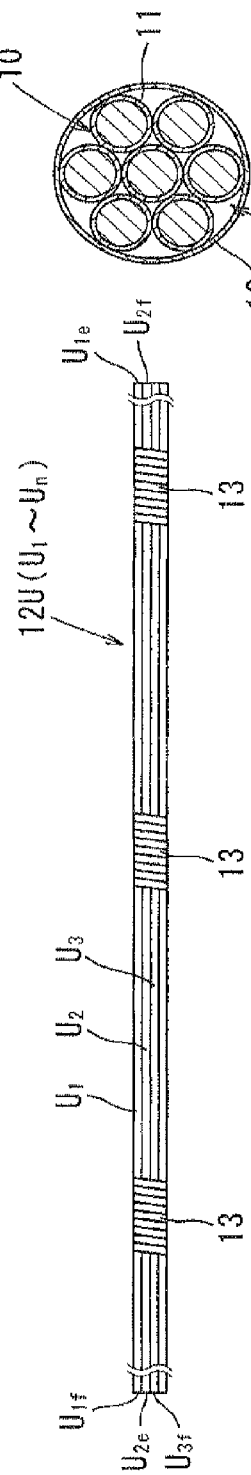
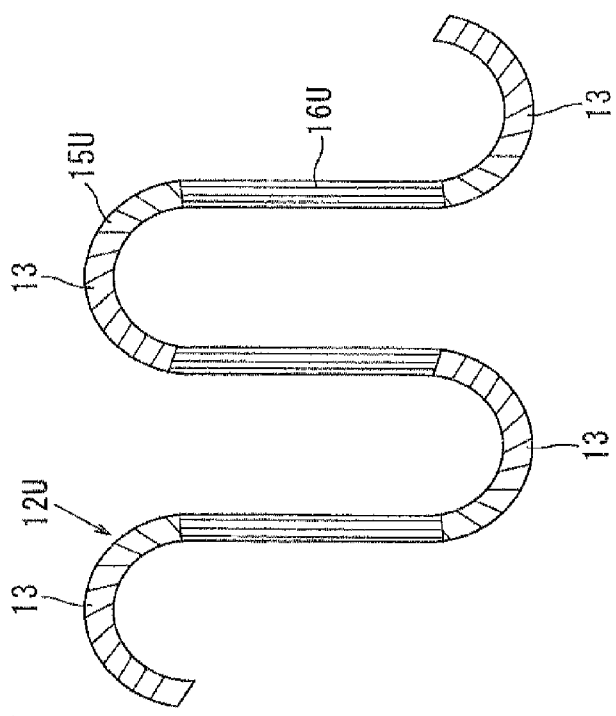

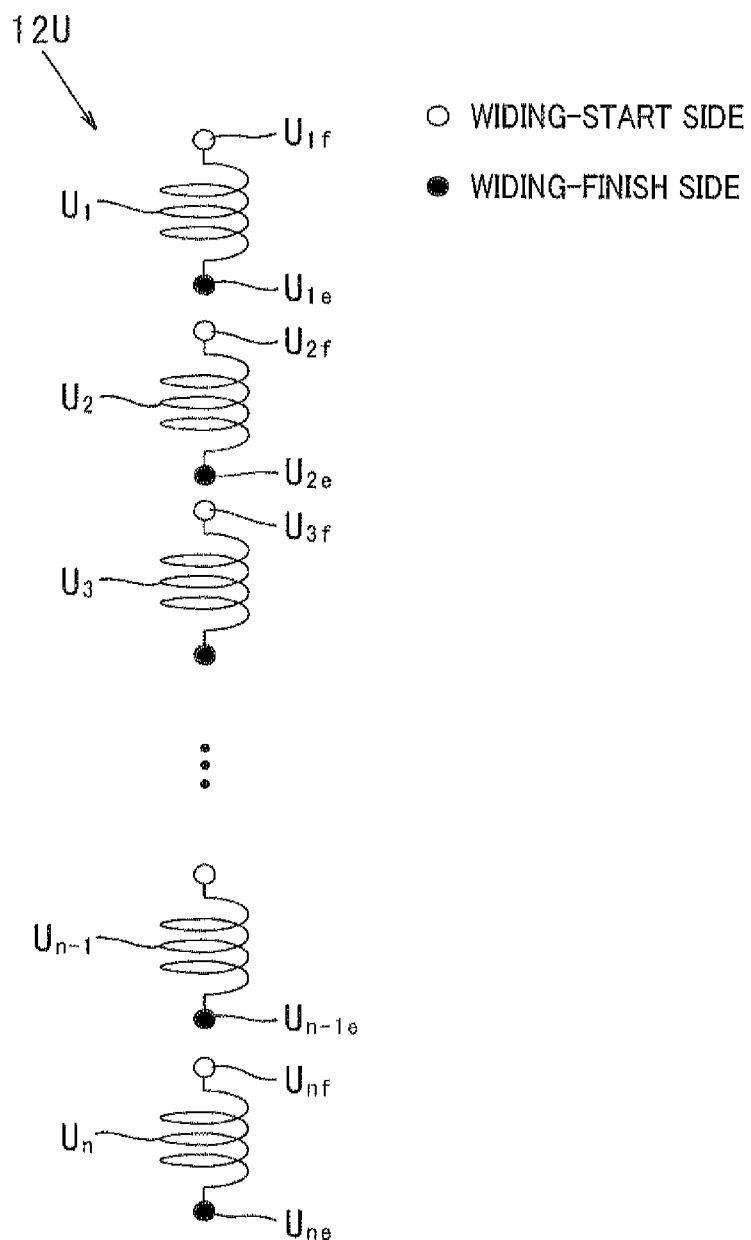

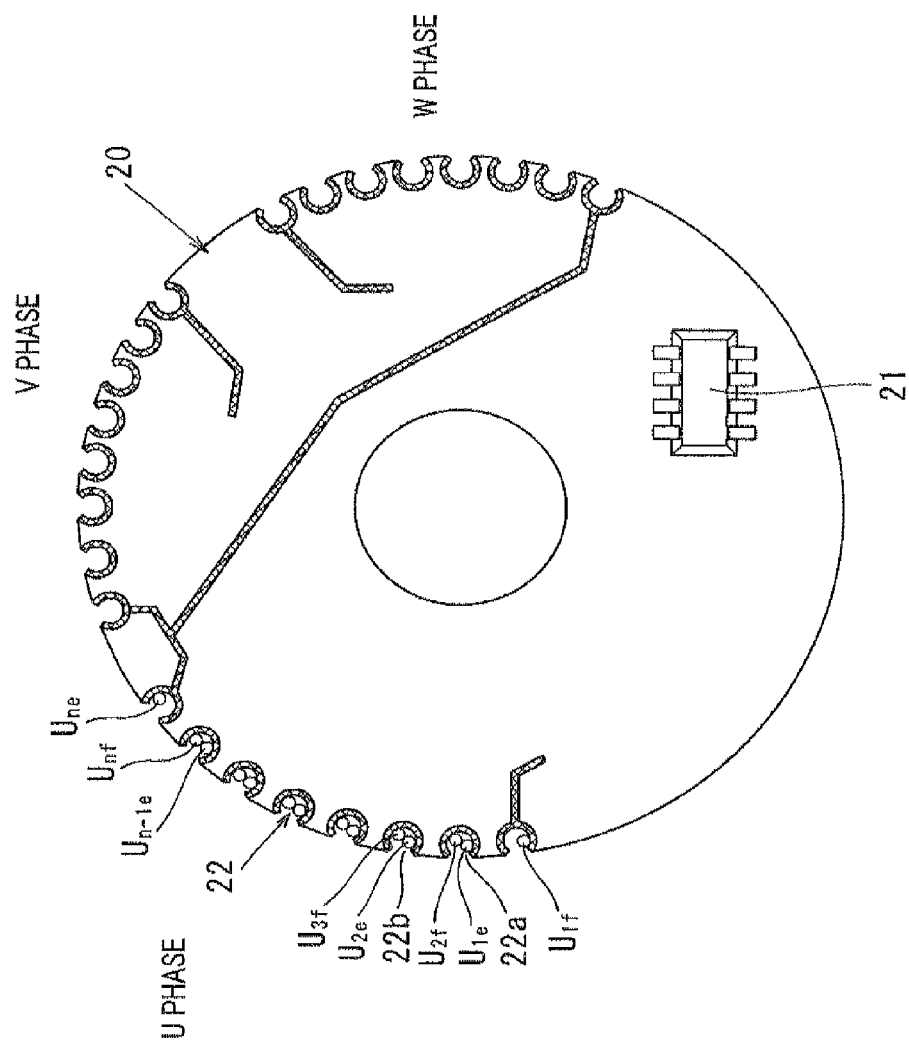

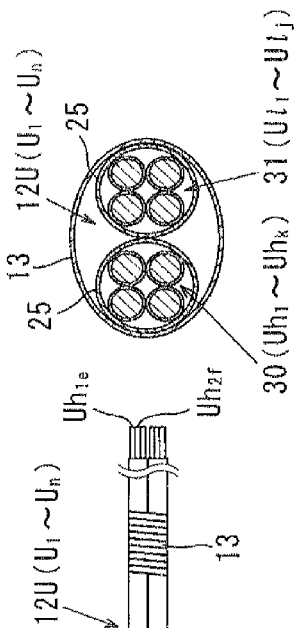
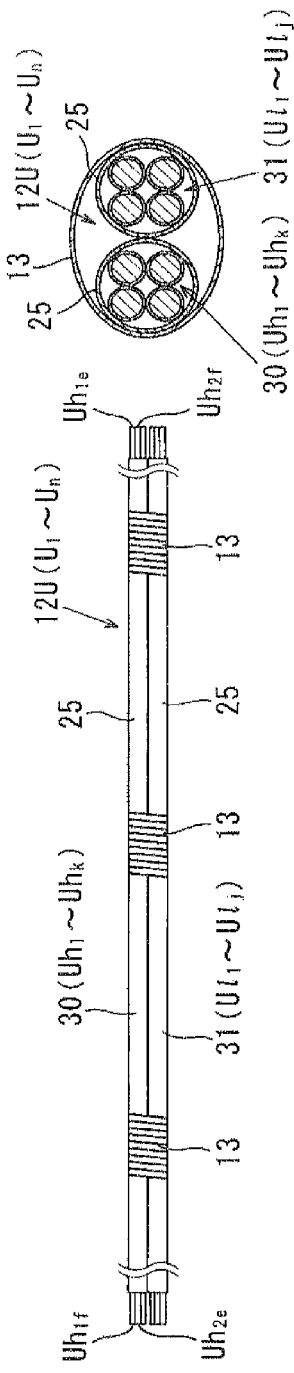
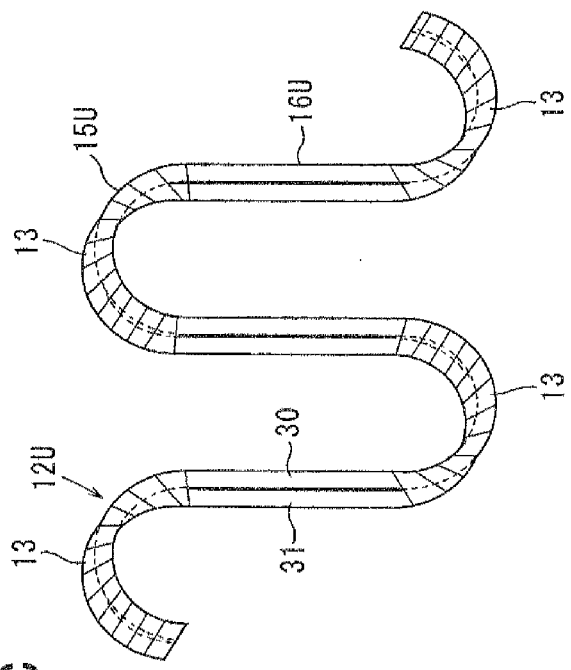

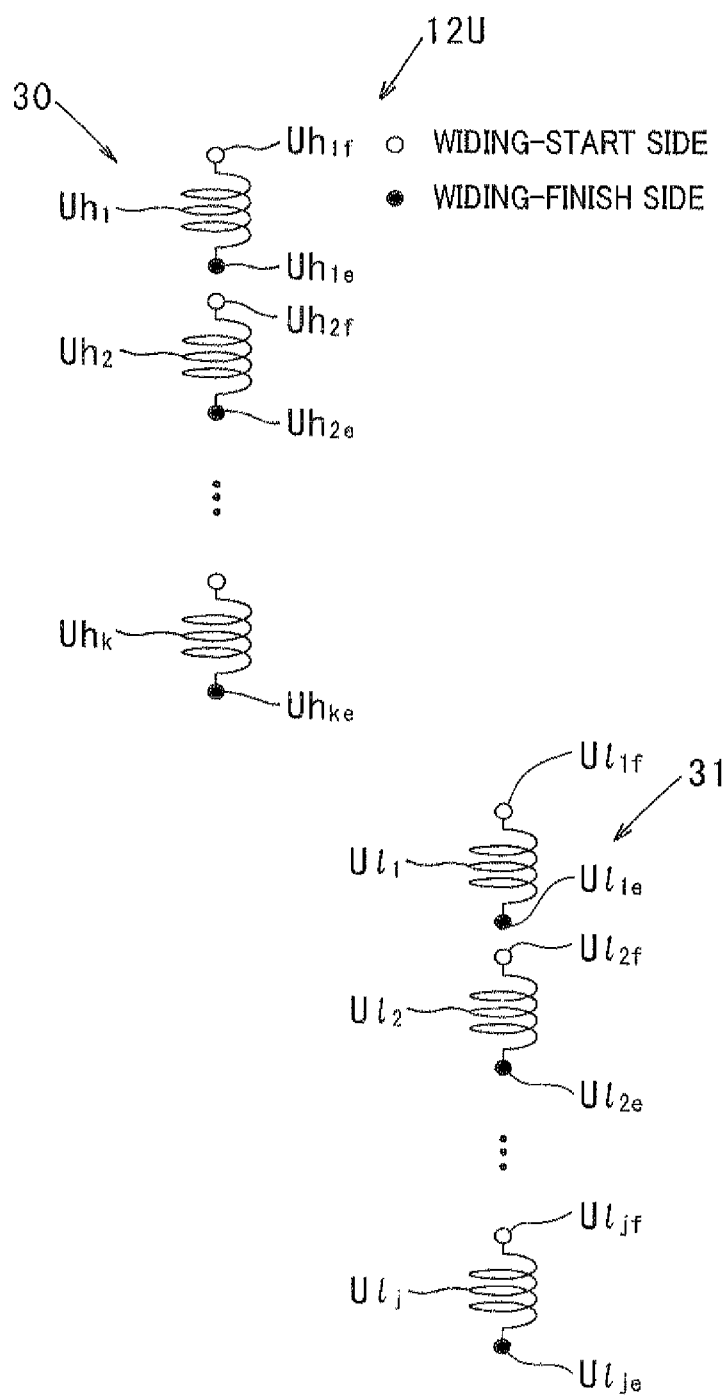

ELECTRIC ROTATING MACHINE

CROSS-REFERENCE TO RELATED APPLICATION

This application is based on and claims priority from Japanese Patent Application No. 2010-206748, filed on Sep. 15, 2010, the content of which is hereby incorporated by reference in its entirety into this application.

BACKGROUND

1. Technical Field

The present invention relates to electric rotating machines that are used in, for example, motor vehicles as electric motors and electric generators. In addition, the invention can also be applied to industrial machines and household electrical appliances.

2. Description of Related Art

Conventionally, there are known electric rotating machines which include an annular stator core (or armature core) and a multi-phase stator coil (or armature coil) that is comprised of a plurality of phase windings wound on the stator core.

Further, for securing electrical insulation between the phase windings, the stator coil is formed of a plurality of insulation-coated electric wires each of which has an insulating coat formed at the surface thereof (see, for example, Japanese Patent Application Publication No. 2008-54404).

Moreover, there are also known methods of winding the stator coil on the stator core, such as concentrated winding and distributed winding methods.

In general, a distributed winding method is preferable to a concentrated winding method in terms of securing high torque. However, when the stator coil is wound on the stator core using a distributed winding method, the phase windings may overlap each other at coil end parts of the stator coil; the coil end parts respectively protrude from opposite axial end faces of the stator core. Consequently, unlike in the case of winding the stator coil using a concentrated winding method, it may become difficult to reliably secure electrical insulation between the phase windings.

To solve the above problem, one may consider increasing the thickness of the insulating coats of the electric wires forming the stator coil, thereby preventing puncture (or breakdown) of the insulating coats from occurring due to partial discharge between the phase windings.

However, on the other hand, with the increase in the thickness of the insulating coats, the space factors of the electric wires in slots of the stator core will be lowered.

In particular, when the electric rotating machine is a high-voltage machine, it is especially difficult to secure electrical insulation between the phase windings by increasing the thickness of the insulating coats while preventing the space factors of the electric wires in the slots from being lowered.

SUMMARY

According to the present exemplary embodiment, there is provided an electric rotating machine which includes a stator core and a multi-phase stator coil. The stator core has a plurality of slots. The stator coil includes a plurality of phase windings and is wound on the stator core in a distributed winding manner. Further, each of the phase windings of the stator coil is formed of an electric wire bundle which includes a plurality of insulation-coated electric wires that are electrically connected to one another. Each of the electric wire bundles forming the phase windings of the stator coil has a plurality of in-slot portions and a plurality of turn portions. Each of the in-slot portions is received in a corresponding one of the slots of the stator core. Each of the turn portions is located outside the slots to connect a corresponding adjacent pair of the in-slot portions of the electric wire bundle. Each of the electric wire bundles further includes a plurality of insulating layers that are respectively formed at predetermined positions, at which the turn portions of the electric wire bundle overlap those of the other electric wire bundles, so as to surround the electric wires of the electric wire bundle.

Consequently, with the insulating layers, it is possible to reliably secure electrical insulation between the phase windings of the stator coil. Moreover, the insulating layers are located outside the slots of the stator core, resulting in no decrease in the space factors of the electric wires in the slots of the stator core. That is, it is possible to reliably secure electrical insulation between the phase windings of the stator coil without lowering the space factors of the electric wires in the slots.

According to further implementations of the exemplary embodiments, for each of the electric wire bundles, the insulating layers are formed to substantially completely cover all the turn portions of the electric wire bundle.

The insulating layers of the electric wire bundles are first insulating layers. For each of the electric wire bundles, the electric wires of the electric wire bundle are divided into a plurality of groups according to electric potentials of the electric wires. For each of the groups, all the electric wires of the group are covered with a second insulating layer.

The electric rotating machine further includes a printed circuit board on which is mounted an inverter circuit for controlling energization of the stator coil. The printed circuit board further has a plurality of copper patterns formed thereon. Each corresponding pair of ends of the electric wires of the electric wire bundles are electrically connected to each other via a corresponding one of the copper patterns.

BRIEF DESCRIPTION OF THE DRAWINGS

The present exemplary embodiments will be understood more fully from the detailed description given hereinafter and from the accompanying drawings of preferred embodiments, which, however, should not be taken to limit the invention to the specific embodiments but are for the purpose of explanation and understanding only.

In the accompanying drawings:

FIG. 2A is a plan view of an electric wire bundle, which makes up a U-phase winding of a stator coil of the stator, before being bent into a wave shape;

FIG. 2B is a cross-sectional view of the electric wire bundle;

FIG. 2C is a plan view of the electric wire bundle after being bent into the wave shape;

FIG. 3 is a schematic view illustrating the electrical connection between electric wires of the electric wire bundle;

FIG. 4 is a front view of a printed circuit board provided in the electric rotating machine;

FIG. 5A is a plan view of an electric wire bundle, which makes up a U-phase winding according to the second embodiment of the invention, before being bent into a wave shape;

FIG. 5B is a cross-sectional view of the electric wire bundle according to the second embodiment;

FIG. 5C is a plan view of the electric wire bundle according to the second embodiment after being bent into the wave shape; and FIG. 6 is a schematic view illustrating the electrical connection between electric wires of the electric wire bundle according to the second embodiment.

DESCRIPTION OF PREFERRED EMBODIMENTS

Figure 1:
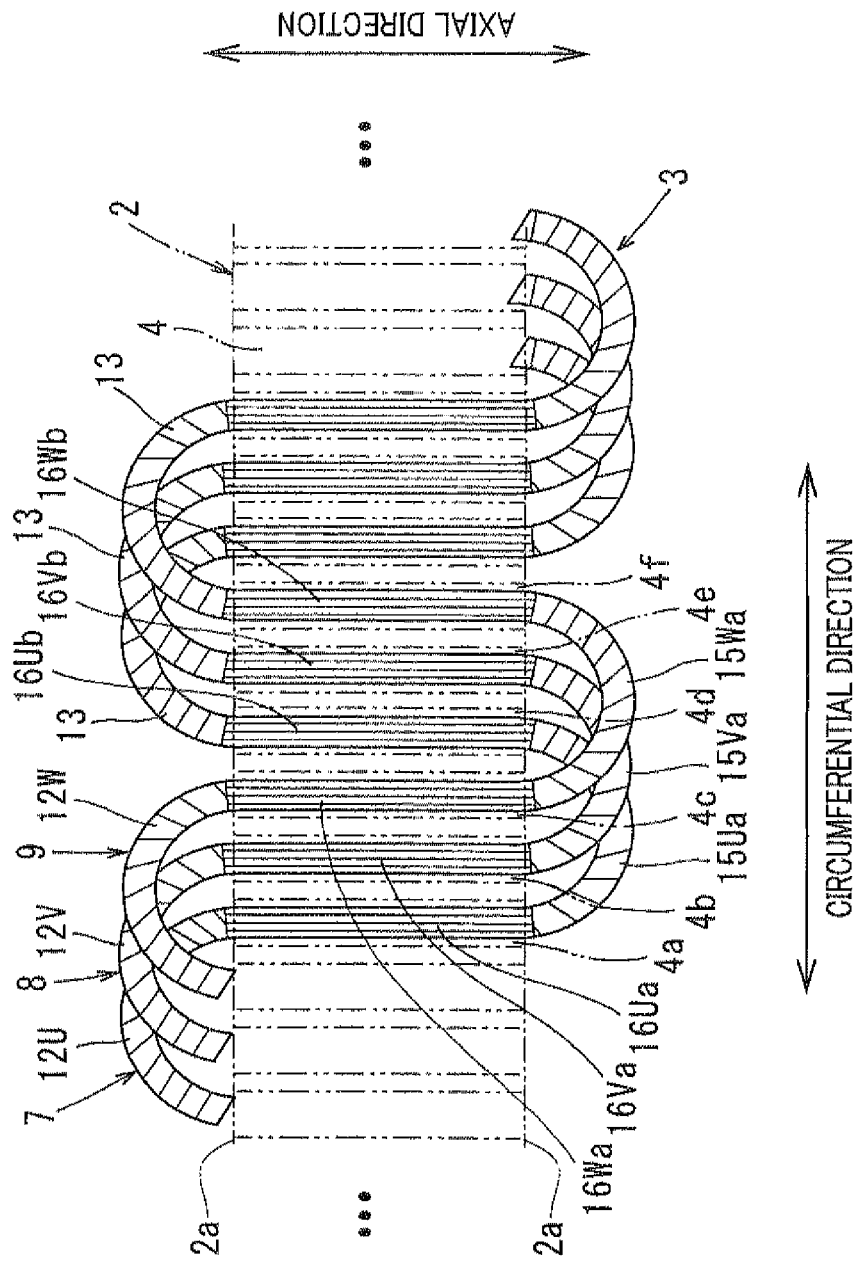
FIG. 1 is a development view of part of a stator of an electric rotating machine according to the first embodiment of the invention.

Preferred embodiments of the present invention will be described hereinafter with reference to FIGS. 1-6. It should be noted that for the sake of clarity and understanding, identical components having identical functions in different embodiments of the invention have been marked, where possible, with the same reference numerals in each of the figures and that for the sake of avoiding redundancy, descriptions of the identical components will not be repeated.

[First Embodiment]

Referring to FIG. 1, a three-phase AC motor according to a first embodiment of the invention includes an annular stator core (or armature core) 2 and a three-phase stator coil (or armature coil) 3. The stator coil 3 is wound on the stator core 2 in a distributed winding manner. The stator core 2 and the stator coil 3 together make up a stator of the motor. The stator creates a rotating magnetic field when the stator coil 3 is supplied with three-phase AC power. In addition to the stator, the motor further includes a rotor (not shown) that is disposed radially inside the stator core 2. The rotor may be a permanent magnet-type rotor, an electromagnet-type rotor or a reluctance-type rotor.

In the present embodiment, the stator core 2 is formed by laminating a plurality of steel sheets in the axial direction of the stator core 2. The stator core 2 has a plurality of slots 4 that are formed in the radially inner surface of the stator core 2 so as to extend over the entire axial length of the stator core 2. In addition, the slots 4 are spaced from one another in the circumferential direction of the stator core 2 at predetermined intervals.

The stator coil 3 includes a U-phase winding 7, a V-phase winding 8 and a W-phase winding 9. In the present embodiment, each of the phase windings 7-9 is formed of an electric wire bundle which includes a plurality of insulation-coated electric wires.

For example, referring to FIGS. 2A and 2B, the U-phase winding 7 is formed of an electric wire bundle 12U which includes n insulation-coated electric wires 10, where n is an integer not less than 2. Each of the electric wires 10 has an insulating coat 11 formed at the surface thereof. In addition, for the sake of convenience of explanation, the n electric wires 10 of the electric wire bundle 12U will be respectively denoted by U1-Un hereinafter.

Referring further to FIG. 3, in the present embodiment, the electric wires U1-Un of the electric wire bundle 12U are electrically connected in series with one another, forming the U-phase winding 7 of the stator coil 3.

Specifically, a winding-finish side end U1e of the electric wire U1 is electrically connected to a winding-start side end U2f of the electric wire U2. A winding-finish side end U2e of the electric wire U2 is electrically connected to a winding-start side end U3f of the electric wire U3. In like manner, a winding-finish side end Un-1e of the electric wire Un-1 is electrically connected to a winding-start side end Unf of the electric wire Un.

Furthermore, in the present embodiment, the electric wire bundle 12U has a plurality of insulating layers 13 each of which is formed at a predetermined position so as to surround the electric wires U1-Un, as shown FIG. 2A. Here, the predetermined positions are positions where, after the stator coil 3 is wound on the stator core 2, the U-phase winding 7 (i.e., the electric wire bundle 12U) overlaps either the V-phase winding 8 or the W-phase winding 9.

More specifically, as shown in FIG. 2C, for being wound on the stator core 2, the electric wire bundle 12U is bent into a wave shape to include a plurality of turn portions 15U and a plurality of in-slot portions 16U. Further, as shown in FIG. 1, after the electric wire bundle 12U is wound on the stator core 2, each of the in-slot portions 16U is received in a corresponding one of the slots 4 of the stator core 2. Each of the turn portions 15U protrudes from a corresponding one of axial end faces 2a of the stator core 2 to connect a corresponding adjacent pair of the in-slot portions 16U. Consequently, the turn portions 15U are located outside the slots 4 of the stator core 2 and alternately on opposite axial sides of the stator core 2 in the circumferential direction.

For example, referring to FIG. 1, the electric wire bundle 12U forming the U-phase winding 7 has the in-slot portion 16Ua received in the slot 4a of the stator core 2, the in-slot portion 16Ub received in the slot 4d of the stator core 2, and the turn portion 15Ua extending across the slots 4b and 4c of the stator core 2 to connect the in-slot portions 16Ua and 16Ub. The electric wire bundle 12V forming the V-phase winding 8 has the in-slot portion 16Va received in the slot 4b of the stator core 2, the in-slot portion 16Vb received in the slot 4e of the stator core 2, and the turn portion 15Va extending across the slots 4c and 4d of the stator core 2 to connect the in-slot portions 16Va and 16Vb. The electric wire bundle 12W forming the W-phase winding 9 has the in-slot portion 16Wa received in the slot 4c of the stator core 2, the in-slot portion 16Wb received in the slot 4f of the stator core 2, and the turn portion 15Wa extending across the slots 4d and 4e of the stator core 2 to connect the in-slot portions 16Wa and 16Wb.

Consequently, each of the turn portions 15U of the electric wire bundle 12U overlaps a corresponding one of the turn portions 15V and 15W of the electric wire bundles 12V and 12W in the axial and radial directions of the stator core 2.

Therefore, for reliably securing electrical insulation between the phase windings 7-9 of the stator coil 3, in the present embodiment, all the turn portions 15U-15W of the electric wire bundles 12U-12W are substantially completely covered with the insulating layers 13.

In addition, in the present embodiment, each of the insulating layers 13 is formed by winding an insulative tape around a corresponding one of the turn portions 15U-15W of the electric wire bundles 12U-12W. However, it should be appreciated that each of the insulating layers 13 may also be formed by other methods, for example by insulation-coating the corresponding turn portion or covering the corresponding turn portion with an insulative tube.

Referring now to FIG. 4, in the present embodiment, the electrical connection between the electric wires 10 forming the phase windings 7-9 of the stator coil 3 is made via a printed circuit board 20 provided in the motor.

Specifically, the printed circuit board 20 has a substantially circular discoid shape and is disposed on one axial side of the stator core 2. The printed circuit board 20 also has a semiconductor module 21 mounted thereon. The semiconductor module 21 has formed therein an inverter circuit for controlling energization of the stator coil 3. On the radially outer periphery of the printed circuit board 20, there are formed a plurality of ports 22. Each of the ports 22 has a copper pattern printed on the interior surface thereof; via the copper pattern, a corresponding pair of the electric wires 10 are electrically connected to each other.

For example, the winding-finish side end U1e of the electric wire U1 is electrically connected to the winding-start side end U2f of the electric wire U2 via the copper pattern formed in the port 22a. More specifically, the insulating coats 11 are first removed from the ends U1e and U2f of the electric wires U1 and U2. Then, both the ends Ute and U2f are disposed within the port 22a so as to abut the copper pattern formed in the port 22a. Thereafter, both the ends U1e and U2f are soldered to the copper pattern, thereby being electrically connected to each other via the copper pattern. In like manner, the winding-finish side end U2e of the electric wire U2 is electrically connected to the winding-start side end U3f of the electric wire U3 via the copper pattern formed in the port 22b.

Moreover, the winding-start side end U1f of the electric wire U1 is electrically connected to the inverter circuit of the semiconductor module 21 via a copper pattern which is printed on the front surface of the printed circuit board 20 and only partially shown in FIG. 4.

The electric wires 10 forming the V-phase and W-phase windings 8 and 9 of the stator coil 3 are also electrically connected in the same manner as the electric wires 10 (i.e., U1-Un) forming the U-phase winding 7.

Furthermore, the winding-finish side end Une of the electric wire Un is electrically connected to both the winding-finish side end Vne of the electric wire Vn (not shown) and the winding-finish side end Wne of the electric wire Wn (not shown) via copper patterns printed on the front surface of the printed circuit board 20. Consequently, the U-phase, V-phase and W-phase windings 7, 8 and 9 of the stator coil 3 are star-connected.

Next, referring back to FIGS. 2A-2C, the manner of winding the U-phase winding 7 on the stator core 2 will be described.

First, the electric wires U1-Un, which are straight in shape, are placed together. Then, the insulating layers 13 are formed at the predetermined positions, thereby binding the electric wires U1-Un together to form the electric wire bundle 12U. Thereafter, the electric wire bundle 12U is bent into the wave shape, thereby forming the turn portions 15U and the in-slot portions 16U. Then, the in-slot portions 16U of the electric wire bundle 12U are respectively placed in the corresponding slots 4 of the stator core 2. As a result, the U-phase winding 7 is obtained which is formed of the wave-shaped electric wire bundle 12U mounted on the stator core 2.

The above-described three-phase AC motor according to the present embodiment has the following advantages.

In the present embodiment, the motor includes the stator core 2 and the three-phase stator coil 3. The stator core 2 has the slots 4 formed therein. The stator coil 3 includes the U-phase, V-phase and W-phase windings 7-9 and is wound on the stator core 2 in the distributed winding manner. The U-phase, V-phase and W-phase windings 7-9 are respectively formed of the electric wire bundles 12U, 12V and 12W. Each of the electric wire bundles 12U-12W includes the n electric wires 10 that are electrically connected to one another. Moreover, each of the electric wire bundles 12U-12W has the in-slot portions, each of which is received in a corresponding one of the slots 4 of the stator core 2, and the turn portions each of which is located outside the slots 4 to connect a corresponding adjacent pair of the in-slot portions of the electric wire bundle. Furthermore, each of the electric wire bundles 12U-12W further includes the insulating layers 13 that are respectively formed at the predetermined positions, at which the turn portions of the electric wire bundle overlap the turn portions of the other two electric wire bundles, so as to surround the n electric wires 10 of the electric wire bundle.

Consequently, with the insulating layers 13, it is possible to reliably secure electrical insulation between the phase windings 7-9 of the stator coil 3. Moreover, the insulating layers 13 are located outside the slots 4 of the stator core 4, resulting in no decrease in the space factors of the electric wires 10 in the slots 4 of the stator core 2. That is, it is possible to reliably secure electrical insulation between the phase windings 7-9 of the stator coil 3 without lowering the space factors of the electric wires 10 in the slots 4.

In particular, when the motor is a high-voltage motor, with the insulating layers 13, it is still possible to reliably prevent partial discharge from occurring between the phase windings 7-9 of the stator coil 3, thereby reliably preventing puncture (or breakdown) of the insulating coats 11 of the electric wires 10 from occurring.

Further, in the present embodiment, for each of the electric wire bundles 12U-12W, the insulating layers 13 are formed to substantially completely cover all the turn portions of the electric wire bundle.

With the above formation of the insulating layers 13, it is possible to further reliably secure electrical insulation between the phase windings 7-9 of the stator coil 3 without lowering the space factors of the electric wires 10 in the slots 4 of the stator core 2.

In the present embodiment, the motor includes the printed circuit board 20 that has the semiconductor module 21 mounted thereon; the semiconductor module 21 includes the inverter circuit for controlling energization of the stator coil 3. The printed circuit board 20 further has the copper patterns formed thereon. Each corresponding pair of the ends of the electric wires 10 of the electric wire bundles 12U-12W are electrically connected to each other via a corresponding one of the copper patterns.

With the above configuration, it is possible to easily make the electrical connection between the electric wires 10, thereby improving the productivity of the motor construction.

[Second Embodiment]

In this embodiment, for each of the electric wire bundles 12U, 12V and 12W, the n electric wires 10 of the electric wire bundle are divided into two groups according to the electric potentials of the electric wires 10.

For example, referring to FIGS. 5A-5C and 6, for the electric wire bundle 12U which makes up the U-phase winding 7, the electric wires U1-Un of the bundle 12U are divided into first and second groups 30 and 31.

The first group 30 consists of the electric wires Uh1-Uhk that are electrically connected in series with one another. For example, a winding-finish side end Uh1e of the electric wire Uh1 is electrically connected to a winding-start side end Uh2f of the electric wire Uh2.

The second group 31 consists of the electric wires Ul1-Ulj that are electrically connected in series with one another. For example, a winding-finish side end Ul1e of the electric wire Ul1 is electrically connected to a winding-start side end Ul2f of the electric wire Ul2.

Further, though not shown in the figures, a winding-start side end Uh1f of the electric wire Uh1 is electrically connected to the inverter circuit. A winding-finish side end Uhke of the electric wire Uhk is electrically connected to a winding-start side end Ul1f of the electric wire Ul1. A winding-finish side end Ulje of the electric wire Ulj is electrically connected to both the electric wire bundles 12V and 12W.

With the above electrical connection, when electric current flows from the electric wire Uh1 to the electric wire Ulj, the electric potentials of the electric wires Uh1-Uhk of the first group 30 are higher than those of the electric wires Ul1-Ulj of the second group 31. In contrast, when electric current flows from the electric wire Ulj to the electric wire Uh1, the electric potentials of the electric wires Uh1-Uhk of the first group 30 are lower than those of the electric wires Ul1-Ulj of the second group 31.

Furthermore, for the first group 30, there is provided an insulating layer 25 that surrounds all the electric wires Uh1-Uhk of the first group 30 over substantially the entire length of the electric wires Uh1-Uhk of the first group 30. For the second group 31, there is also provided an insulating layer 25 that surrounds all the electric wires Ul1-Ulj of the second group 31 over substantially the entire length of the electric wires Ul1-Ulj.

In addition, in the present embodiment, each of the insulating layers 25 is formed of an insulative tube. However, it should be noted that each of the insulating layers 25 may also be formed by other methods, for example, winding an insulative tape around the electric wires or insulation-coating the electric wires.

Next, the manner of winding the U-phase winding 7 on the stator core 2 according to the present embodiment will be described.

In the first step, the electric wires Uh1-Uhk of the first group 30, which are straight in shape, are placed together and inserted in an insulative tube. Consequently, the insulating layer 25 is obtained which covers all the electric wires Uh1-Uhk of the first group 30. Similarly, the electric wires Ul1-Ulj of the second group 31, which are straight in shape, are placed together and inserted in an insulating tube. Consequently, the insulating layer 25 is obtained which covers all the electric wires Ul1-Ulj of the second group 31.

In the second step, the first and second groups 30 and 31 are placed together. Then, the insulating layers 13 are formed at the predetermined positions as shown in FIG. 5A, thereby binding the first and second groups 30 and 31 together to form the electric wire bundle 12U.

In the third step, the electric wire bundle 12U is bent into the wave shape as shown in FIG. 5C, thereby forming the turn portions 15U and the in-slot portions 16U.

In the fourth step, the in-slot portions 16U of the electric wire bundle 12U are respectively placed in the corresponding slots 4 of the stator core 2.

As a result, the U-phase winding 7 is obtained which is formed of the wave-shaped electric wire bundle 12U mounted on the stator core 2.

The above-described three-phase AC motor according to the present embodiment has the same advantages as that according to the first embodiment.

In addition, in the motor according to the present embodiment, for each of the electric wire bundles 12U, 12V and 12W, the electric wires of the first group are electrically insulated by the insulating layers 25 from those of the second group. Consequently, it is possible to reliably prevent partial discharge from occurring between the electric wires of the same electric wire bundle, thereby further improving the insulation properties of the motor.

While the above particular embodiments of the present invention have been shown and described, it will be understood by those skilled in the art that various modifications, changes, and improvements may be made without departing from the spirit of the invention.

For example, in the previous embodiments, the present invention is directed to a three-phase AC motor. However, it is also possible to apply the invention to other electric rotating machines, such as a three-phase AC generator.

In the second embodiment, for each of the electric wire bundles 12U, 12V and 12W, the first group 30 is electrically connected in series with the second group 31. However, it is also possible to electrically connect the first and second groups 30 and 31 in parallel with each other.

In the second embodiment, for each of the electric wire bundles 12U, 12V and 12W, the electric wires of the electric wire bundle are divided into the first and second groups 30 and 31. However, it is also possible to divide the electric wires of the electric wire bundle into more than two groups according to the electric potentials of the electric wires.

What is claimed is:

1. An electric rotating machine comprising:
a stator core having a plurality of slots; and
a multi-phase stator coil including a plurality of phase windings wound on the stator core in a distributed winding manner,
wherein
each phase winding is formed by conductively interconnected ends of pairs of insulation-coated lengths of conductive wires in an electric wire bundle,
each of the electric wire bundles has a plurality of in-slot portions and a plurality of turn portions between ends of the conductive wires included therein, each of the in-slot portions being received in a corresponding one of the slots of the stator core, each of the turn portions being located outside the slots, and
each of the electric wire bundles further includes a plurality of insulating layers that are formed at respective different predetermined positions at which the turn portions of the electric wire bundle overlap those of other electric wire bundles, so as to surround the electric wires of the electric wire bundle thus providing additional electric insulation between the different wire bundles.

2. The electric rotating machine as set forth in claim 1, wherein for each of the electric wire bundles, the insulating layers are formed to substantially completely cover all of each turn portion of the electric wire bundle.

3. The electric rotating machine as set forth in claim 1, wherein the insulating layers of the electric wire bundles are first insulating layers, and, for each of the electric wire bundles, electric wires therewithin are divided into a plurality of groups according to expected electric potentials of the electric wires during operation, and
for each of the groups, all electric wires of that group are covered with a second insulating layer extending along substantially the entire length of each group of conductive wires.

4. The electric rotating machine as set forth in claim 1, further comprising a printed circuit hoard on which is mounted an inverter circuit for controlling energization of the stator coil, wherein:
the printed circuit hoard further has a plurality of copper patterns formed thereon, and
the pairs of the ends of the conductive wire lengths constituting the electric wires of each electric wire bundle are electrically connected to each other via respectively corresponding one of the copper patterns.

5. The electric rotating machine as set forth in claim 1, wherein each of the insulating layers comprises an insulative tape wound around the electric wires of one of the electric wire bundles.

6. The electric rotating machine as set forth in claim 1, wherein the insulating layers formed to surround the electric wires of the electric wire bundle insulate the electric wire bundle only from other electric wire bundles of a different phase.

7. A method of manufacturing a stator core of an electric rotating machine, said stator core having a plurality of axially extending slots distributed around its circumference, the method comprising:
- grouping insulation-coated lengths of conductive wires into a plurality of electric wire bundles, one bundle for each of a plurality of stator core phase windings;
- surrounding each of the plurality of electric wire bundles with a plurality of insulating layers at predetermined positions spaced apart along the lengths of each bundle;
- bending each electric wire bundle into a wave shape such that the wire bundle has a plurality of in-slot portions and a plurality of turn portions, each turn portion including a said insulating layer;
- placing each electric wire bundle on the stator core in a distributed winding manner such that each of the in-slot portions is inserted into a corresponding slot of the stator core and each of the turn portions is located outside the slots; and
- conductively interconnecting ends of pairs of the lengths of conductive wires in each bundle to form a phase winding of the stator core,
- wherein the predetermined positions of said insulating layers are positions at which the turn portions of one electric wire bundle overlaps those of another electric wire bundle.

8. The method as set forth in claim 7, wherein the surrounding step comprises substantially completely covering all of each turn portion of each of the electric wire bundles.

9. The method as set forth in claim 7, wherein the insulating layers of the electric wire bundles are first insulating layers, and further comprising:
- sub-grouping the electric wires in each electric wire bundle into a plurality of sub-groups according to expected electric potentials of the electric wires during operation; and
- covering all electric wires of each sub-group with a second insulating layer extending along substantially the entire length of each sub-group of conductive wires.

10. The method as set forth in claim 7, further comprising:
- forming a plurality of copper patterns on a printed circuit board; and
- mounting an inverter circuit for controlling energization of the stator coil on the printed circuit board,
- wherein the conductively interconnecting step comprises conductively interconnecting ends of pairs of the lengths of conductive wires in each electric wire bundle to each other via a corresponding one of the copper patterns.

11. The method as set forth in claim 7, wherein the surrounding step comprises winding an insulative tape around the electric wires of each electric wire bundle.

12. The method as set forth in claim 7, wherein the insulating layers surrounding each electric wire bundle insulate the electric wire bundle only from other electric wire bundles of a different phase.

* * * * *